UNITED STATES PATENT OFFICE 2,691,052

PURIFICATION OF PERFLUOROCOMPOUNDS

Martin R. Cines, Knoxville, Tenn., assignor to Phillips Petroleum Company, a corporation of Delaware No Drawing. Application September 12, 1951, Serial No. 246,337

3 Claims. (Cl. 260—648)

This invention relates to a process for the substantial removal of impurities boiling in the same boiling range as perfluorocompounds from said perfluorocompounds. In one of its aspects this invention relates to a process for the substantial removal of incompletely fluorinated compounds containing hydrogen or chlorine atoms from the completely substituted perfluorocompounds which may be, among others, non-acidic and non-basic perfluorocarbon, perfluoroethers, perfluoroketones and the like.

In the manufacture of perfluorocompounds, all the hydrogen atoms attached to carbon atoms of an organic compound, except those hydrogen atoms whose substitution would affect the nature of the functional groups present, are replaced by fluorine atoms. The substitution of fluorine for hydrogen in a hydrocarbon is a highly exothermic reaction because of the high heat of formation of hydrogen-to-fluorine and carbon-to-fluorine bonds and, therefore, the reaction is difficult to control and undesirable compounds such as incompletely fluorinated hydrocarbons are formed.

In the most widely used process for the production of completely substituted perfluorocarbons by the replacement of hydrogen atoms, the fluorination of the hydrocarbon is accomplished by direct fluorination in the presence of cobalt trifluoride or some other high-valence metal fluoride. The cobalt trifluoride is converted to the difluoride, which is then reconverted to the trifluoride with fluorine gas. The fluorination of hydrocarbons may also be performed in the vapor phase by reaction of the fluorine, which is diluted with nitrogen, with the hydrocarbon and the high heat of reaction dissipated by passage of the reaction products through copper gauze. The unreacted hydrocarbons are then separated from the perfluorocarbons by distillation; however, some of the incompletely substituted perfluorocarbons and other undesirable compounds are also found in the finished product since these compounds boil in the same boiling range of the perfluorocarbons. Another method of fluorination of organic compounds comprises the electrolysis of a solution of the organic material in the presence of hydrogen fluoride or some other compound which will permit the solution to conduct electricity.

An important method of fluorination is the process in which the fluorine atoms are exchanged for other halogens, usually chlorine, which have previously been substituted for the hydrogen atoms of the organic compound. Antimony pentafluoride is a very reactive reagent and has found extensive use for the catalyzed substitution of fluorine for chlorine; however, its use is limited because completely fluorinated compounds cannot be produced by this process. In practice, antimony pentafluoride is used for the fluorination of methyl carbon atoms attached to cyclic structures or a portion of the carbon atoms in an aliphatic chlorinated hydrocarbon and either vapor-phase fluorination or catalytic fluorination with cobalt trifluoride is used to complete the fluorination process by replacing the residual hydrogen and chlorine atoms. This combination process also requires less elemental fluorine, which is difficult and expensive to produce on a large scale, than direct fluorination using cobalt trifluoride alone. Unfortunately, the perfluorocompounds obtained in this process often still contain small quantities of incompletely-fluorinated compounds, that is chlorocompounds, in addition to other undesirable compounds which are not readily separated from the perfluorocompounds by the usual purification methods.

Perfluorocompounds are usually characterized by their high stability and lack of chemical activity. The lower-boiling compounds have low toxicity and non-flammability and are usually used as refrigerants and as heat transfer mediums, whereas the higher-boiling perfluorocompounds have viscosity and density characteristics which permit their use as lubricants. In general, the most important property in the usefulness of perfluorocompounds is their chemical inertness which permits their use in contact with strong chemical reagents and solvents. Unfortunately, the presence of small quantities of impurities, particularly compounds in which some of the hydrogen and chlorine atoms have not been replaced by fluorine atoms, destroys this property of chemical inertness and results in instability of the compound.

According to this invention there is provided a process for the purification of perfluorocompounds whereby undesirable compounds, boiling in the same boiling range as the perfluorocompound to be purified and comprising incompletely fluorinated compounds containing hydrogen or chlorine atoms, are effectively removed by reaction of said undesirable compounds with a nitrogen base, such as ammonia or an amine, at either atmospheric conditions or temperatures within the range of −50° to 250° C., preferably 25° C. or lower, and pressures sufficient to maintain the liquid phase and then by separation of the solid reaction product formed from the perfluorocompound by filtration, adsorption on an adsorbing agent or by vacuum distillation of the purified material from the dissolved impurity complex or compound.

Although I believe the impurities removed according to this invention to be incompletely fluorinated compound containing some molecules in which all the hydrogen or chlorine atoms have not been replaced by fluorine atoms, and I have discussed them as such, other impurities of an unknown origin, and which are effectively removed by the process of my invention, may be present.

As stated, the process of my invention is concerned with the conversion of the impurity contained in the perfluorocompound into a solid product which may be readily removed from the purified perfluorocompound by the usual methods of separation such as adsorption on an adsorption agent or by filtration. The formation of this solid product is obtained by the agitation of either a nitrogen base or a mixture of nitrogen bases, such as ammonia or amines, with the contaminated perfluorocompound, preferably within the temperature range of −50 to 250° C., for a period of time sufficient for the substantial completion of the reaction. Although I prefer to carry-out the process of my invention in the temperature range of −50 to 250° C. and I usually maintain a temperature of around 25° C. or lower, I may carry out the reaction at any suitable temperature at which both the perfluorocompound and the nitrogen base are in the liquid phase. I may also operate at either atmospheric pressure or some other pressure which will enable me to perform the reaction in the liquid phase and at a more suitable temperature. The reaction time necessary for the substantial completion of the reaction cannot be readily specified since the various nitrogen bases and perfluorocompounds impurities do not have the same reaction rates. The reaction time and other process variables can, however, be quickly determined by those skilled in the art by mere routine test with the contaminated perfluorocompound and the nitrogen base, since the reaction product is usually a precipitate. This spot check also enables one skilled in the art to determine whether or not a perfluorocompound of questionable contamination must be purified.

*Example I*

A mixture of 50 cc. of perfluorodimethylcyclohexane and 50 cc. of di-n-propylamine were agitated for 40 minutes at room temperature and atmospheric pressure with a noticeable evolution of heat resulting from the high heat of reaction. The solid compound formed was first removed by filtration and the residual material by a silica gel adsorbent to substantially improve the purity of the perfluorodimethylcyclohexane as shown by the increase in density from 1.8469 to 1.8486 and the narrowing of the boiling range from 191 to 216° F. for the untreated perfluorocompound to 205 to 216° F. for the treated compound.

*Example II*

A mixture of 10 cc. of perfluorodimethylcyclohexane and 16.8 grams of anhydrous ammonia were agitated for 2 hours at approximately −35° C. and atmospheric pressure. After removal of the solid reaction product containing the impurities the density of the treated perfluorodimethylcyclohexane was found to have increased from 1.8469 to 1.8491. In order to determine the effectiveness of the purification step, the previously treated perfluorodimethylcyclohexane was again reacted with anhydrous ammonia for a period of approximately one week. The density of the recovered product had been increased to only 1.8492, thereby showing that the removal of the impurities is substantially complete.

It is preferred to utilize ammonia and primary and secondary alkyl, alkenyl and aryl amines in the purification process described in this specification. Tertiary amines such as tributyl amine and pyridine may be used, but they react relatively slowly and are therefore less desirable. Primary and secondary amines containing methyl, ethyl, propyl, butyl, amyl, hexyl, phenyl, benzyl and similar groups are satisfactorily utilized. In the case of secondary amines, the groups need not be alike.

Herein and in the claims the term "perfluorocompound" is intended to include only completely fluorinated compounds, that is compounds containing fluorine in the place of all hydrogens attached to carbon atoms, as defined above.

Reasonable variation and modification are possible within the scope of the foregoing disclosure and the appended claims to the invention the essence of which is that a method has been set forth for the purification of perfluorocompounds by reaction with a nitrogen-containing base such as ammonia or an amine to form a separable product with any impurities present.

I claim:

1. The purification of perfluorodimethylcyclohexane which comprises agitating the said compound with di-normal-propylamine to form a reaction product by interaction of the said di-normal-propylamine with impurities contained in said perfluorodimethylcyclohexane and then removing the said reaction product from the said perfluorodimethylcyclohexane.

2. A method according to claim 1 wherein the said reaction product is removed by filtration followed by silica gel adsorption.

3. The purification of perfluorodimethylcyclohexane to remove therefrom incompletely fluorinated compounds which comprises intimately contacting the same with approximately an equivalent amount of di-n-propylamine for about 1 hour thus forming a solid compound and then removing the said solid compound from the perfluorodimethylcyclohexane by filtration and then passing said perfluorodimethylcyclohexane through an adsorbent to further improve its purity.

References Cited in the file of this patent

UNITED STATES PATENTS

| Number | Name | Date |
| --- | --- | --- |
| 2,558,624 | Murray | June 26, 1951 |